US009223420B2

(12) United States Patent
Kim

(10) Patent No.: US 9,223,420 B2
(45) Date of Patent: Dec. 29, 2015

(54) APPARATUS FOR DRIVING ELECTRONIC DEVICE AND DRIVING METHOD THEREOF

(75) Inventor: Youn Soo Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 14/240,063

(22) PCT Filed: Aug. 20, 2012

(86) PCT No.: PCT/KR2012/006592
§ 371 (c)(1),
(2), (4) Date: Feb. 21, 2014

(87) PCT Pub. No.: WO2013/027983
PCT Pub. Date: Feb. 28, 2013

(65) Prior Publication Data
US 2014/0191962 A1 Jul. 10, 2014

(30) Foreign Application Priority Data
Aug. 23, 2011 (KR) .......................... 10-2011-0084237

(51) Int. Cl.
G06F 3/033 (2013.01)
G06F 3/0354 (2013.01)
G06F 3/038 (2013.01)
G06F 3/0362 (2013.01)
G06F 3/0338 (2013.01)

(52) U.S. Cl.
CPC ............ *G06F 3/03547* (2013.01); *G06F 3/038* (2013.01); *G06F 3/0338* (2013.01); *G06F 3/0362* (2013.01); *G06F 3/03543* (2013.01); *G06F 3/03545* (2013.01); *G06F 3/03549* (2013.01); *G06F 2203/04105* (2013.01)

(58) Field of Classification Search
None
See application file for complete search history.

(56) References Cited

U.S. PATENT DOCUMENTS

| 5,530,455 A * | 6/1996 | Gillick et al. ................ 345/163 |
| 5,673,066 A | 9/1997 | Toda et al. |
| 2004/0017355 A1 * | 1/2004 | Shim ............................. 345/157 |

(Continued)

FOREIGN PATENT DOCUMENTS

| JP | 2006-268665 | 10/2006 |
| KR | 1998-032331 | 7/1998 |

(Continued)

OTHER PUBLICATIONS

International Search Report issued Feb. 20, 2013 in corresponding International Patent Application No. PCT/KR2012/006592 (5 pages, in Korean with English translation).

(Continued)

*Primary Examiner* — Muhammad N Edun
(74) *Attorney, Agent, or Firm* — NSIP Law

(57) ABSTRACT

A method of driving an electronic device easily and accurately controls a pointer displayed on a screen of the electronic device. The method of driving an electronic device including an input unit into which information is input by a touch and a screen display unit on which a pointer is displayed in response to the touch includes: a first step of moving the pointer from a point at which the touch is applied to the input unit first in an arbitrary direction in which drag of the pointer is performed; a second step of stopping the movement of the pointer when the drag is stopped; and a third step of additionally moving the pointer in a direction, which is directed from the point at which the touch is applied first to a point to which pressing pressure is applied, in response to pressing pressure when the drag is stopped.

13 Claims, 9 Drawing Sheets

(56) References Cited

U.S. PATENT DOCUMENTS

2008/0088596 A1    4/2008    Prest et al.
2010/0271326 A1    10/2010    Hu et al.

FOREIGN PATENT DOCUMENTS

| KR | 2002-0059700 | 7/2002 |
|---|---|---|
| KR | 10-2009-0083550 | 8/2009 |
| KR | 10-2010-0083269 | 7/2010 |
| KR | 10-2010-0104884 | 9/2010 |
| KR | 10-2010-0118858 | 11/2010 |

OTHER PUBLICATIONS

Extended European Search Report issued on Apr. 9, 2015 in Counterpart European Application No. EP 12826164.1 (14 pages).

* cited by examiner

→ XYZ AXIAL TOUCH PAD COMBINING TWO FUNCTIONS

XYZ AXIAL TOUCH PAD MOUNTED IN HOUSING

APPARATUS FOR DRIVING ELECTRONIC DEVICE AND DRIVING METHOD THEREOF

CROSS-REFERENCE TO RELATED APPLICATIONS

This application is a National Phase Entry of International Patent Application No. PCT/KR2012/006592, filed on Aug. 20, 2012, which claims priority to and the benefit of Korean Patent Application No. 10-2011-0084237, filed on Aug. 23, 2011, the disclosures of which are incorporated herein by reference in their entirety.

TECHNICAL FIELD

The present invention relates generally to an apparatus for driving an electronic device and a driving method thereof and, more particularly, to a method and apparatus for driving an electronic device, capable of controlling input of the electronic device.

BACKGROUND ART

Electronic devices require an input unit to input or control information. In the case of computers, a mouse and a keyboard are most widely used as the input unit. Further, in the case of laptop computers or netbooks, a touch pad is used as the input unit. In the case of recently developed digital televisions, a remote controller is used as the input unit. Smart phones or smart pads such as iPad or Galaxy Tab use a touch pad or a touch screen as the input unit. The mouse enables anyone to easily input desired information, but has several limitations.

The mouse is classified into a mechanical type, an optical type, and an opto-mechanical type. The mechanical mouse is designed to detect movement of a ball located at a lower end thereof and move a pointer in response to the movement. The optical mouse is designed to detect movement on an underlying grid pad on the basis on a change in grid detected by a photosensor located at a lower end thereof, and move a pointer in response to the movement. The opto-mechanical is designed to detect movement of a disk with slits using photosensors, and move a pointer in response to the movement.

Such conventional mice employ a method in which the mouse is moved by a user, and detects the movement to move the pointer in response to the movement. As such, to move the pointer using the mouse, a space which the mouse can move is essentially required.

DISCLOSURE

Technical Problem

Accordingly, the present invention is directed to a method and apparatus for driving an electronic device, capable of easily and accurately controlling a pointer displayed on a screen of the electronic device within a limited space.

Technical Solution

According to an aspect of the present invention, there is provided a method of driving an electronic device including an input means into which information is input by a touch and a screen display means on which a pointer is displayed in response to the touch. The method includes: a first step of moving the pointer from a point at which the touch is applied to the input means first in an arbitrary drag direction in which the pointer undergoes drag; a second step of stopping the movement of the pointer when the drag is stopped; and a third step of additionally moving the pointer in a direction, which is directed from the point at which the touch is applied first to a point to which pressing pressure is applied, in response to pressing pressure when the drag is stopped.

The method may further include: a fourth step of moving the pointer in the drag direction when the drag is additionally carried out to another point based on the point to which the pressing pressure is applied; a fifth step of stopping the movement of the pointer when the drag is stopped in the fourth step; and a sixth step of additionally moving the pointer in the drag direction in response to the pressing pressure at the point at which the drag is stopped.

When the pressing pressure is applied to the same point twice or more, the pointer may be subjected to a change in movement speed in correspondence with the applied pressing pressure.

The pointer may be subjected to a change in movement speed in response to magnitude of the pressing pressure.

The pointer may move at two or more different speeds according to the magnitude of the pressing pressure.

The pressing pressure may be implemented by a switching operation.

The pressing pressure may be detected by a pressure sensor or a tactile sensor.

The pointer may have a movement speed determined depending on the drag speed in response to the pressing pressure when the drag is stopped.

The input means may include a touchscreen or a touchpad.

According to another aspect of the present invention, there is provided an apparatus for driving an electronic device, which includes: a housing having a seat recess; an input signal transfer main body that is fitted into the seat recess in whole or in part, and controls movement of a pointer displayed on a screen display unit; a direction detecting means that is located on the top of the input signal transfer main body, and generates a movement direction signal of the pointer; and a speed detecting means that is located at the bottom of the input signal transfer main body, and generates an additional movement signal or a movement speed change signal of the pointer in response to pressing pressure of the input signal transfer main body when the pressing pressure is applied. The movement of the pointer displayed on the screen display unit is controlled using at least one of the movement direction signal of the pointer which is generated by the direction detecting means, the additional movement signal of the pointer which is generated by the speed detecting means, and the movement speed change signal of the pointer which is generated by the speed detecting means.

When the pressing pressure of the input signal transfer main body is applied to the same point twice or more, the pointer may be subjected to a change in movement speed in correspondence with the applied pressing pressure.

The pressing pressure of the input signal transfer main body may be implemented by a switching operation.

The pointer may be subjected to a change in movement speed in response to magnitude of the pressing pressure of the input signal transfer main body.

The pressing pressure of the input signal transfer main body may be detected by a pressure sensor or a tactile sensor.

The direction detecting means provided on the top of the input signal transfer main body may include a touchpad.

Advantageous Effects

According to the present invention as described above, a pointer displayed on a screen of the electronic device can be easily and accurately controlled. With use of the apparatus for driving an electronic device according to the present invention, a pointer of the screen display unit can be controlled by minimum movement using one finger. Further, the pointer moving on the screen is accelerated in cooperation with magnitude of the pressing pressure. Thereby, the movement of the pointer can be rapidly realized although the screen is relatively wide.

MODE FOR INVENTION

Hereinafter, most preferred embodiments of the present invention will be described in detail with reference to the accompanying drawings to such an extent that technical spirit of the present invention can be easily implemented by those skilled in the art.

Figure 1:
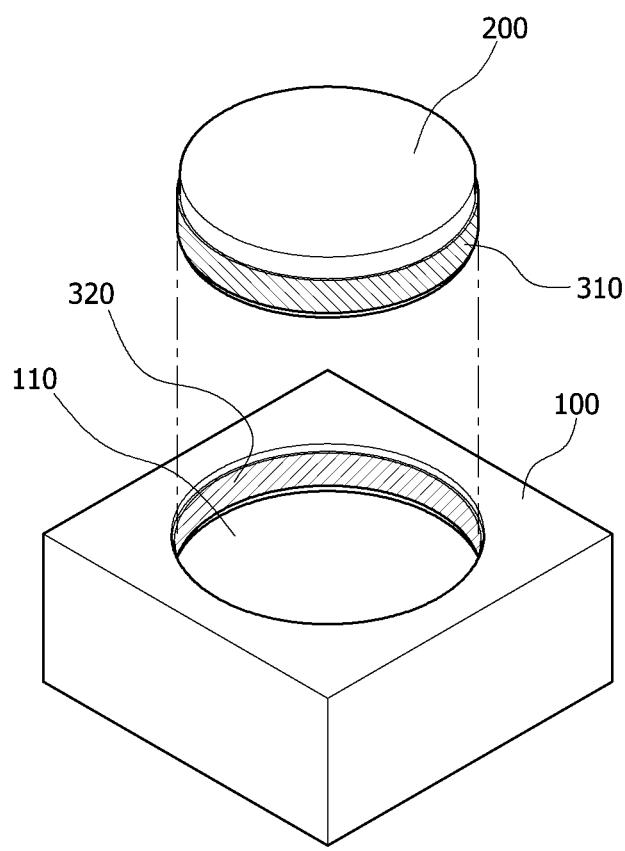
FIG. 1 shows an apparatus for driving an electronic device according to a first embodiment of the present invention.

FIG. 1 shows an apparatus for driving an electronic device according to a first embodiment of the present invention.

As shown in FIG. 1, the apparatus for driving an electronic device according to the present embodiment includes a housing 100 in which a seat recess 110 is formed, a mouse main body 200 fitted into the seat recess 110 in whole or in part, a direction detecting means 310 that is mounted on the top of the mouse main body 200 or on an inner wall of the seat recess 110, and detects a direction of an external force applied to the mouse main body 200 to generate a movement direction signal of a pointer, and at least one speed detecting means 320 that is mounted at the bottom of the mouse main body 200 or on an inner wall or bottom of the seat recess 110, and detects magnitudes of various external forces such as pressing pressure applied to the mouse main body to generate a additional movement signal or a speed change signal of the pointer.

As shown in the present embodiment, the direction detecting means 310 may be formed on the top of the mouse main body in a touchpad type, and the speed detecting means 320 may be formed in a switch type. One or more speed detecting means 320 may be configured to be mounted at the bottom of the mouse main body 200. In other words, the direction detecting means 310 functions as a typical touchpad, and may be formed in any structure as long as movement of the pointer is possible. The speed detecting means 320 may also be mounted anywhere at the bottom of the mouse main body, or the inner wall or bottom of the seat recess, and be formed in any structure as long as the magnitudes of external forces including the pressing pressure of the mouse main body 200 can be measured.

FIGS. 2 to 5 show an apparatus for driving an electronic device according to a second embodiment of the present invention.

The apparatus for driving an electronic device according to the present embodiment includes at least one speed detecting means 320 and a direction detecting means 310, and may be configured to directly receive a force of a user.

Figure 2:
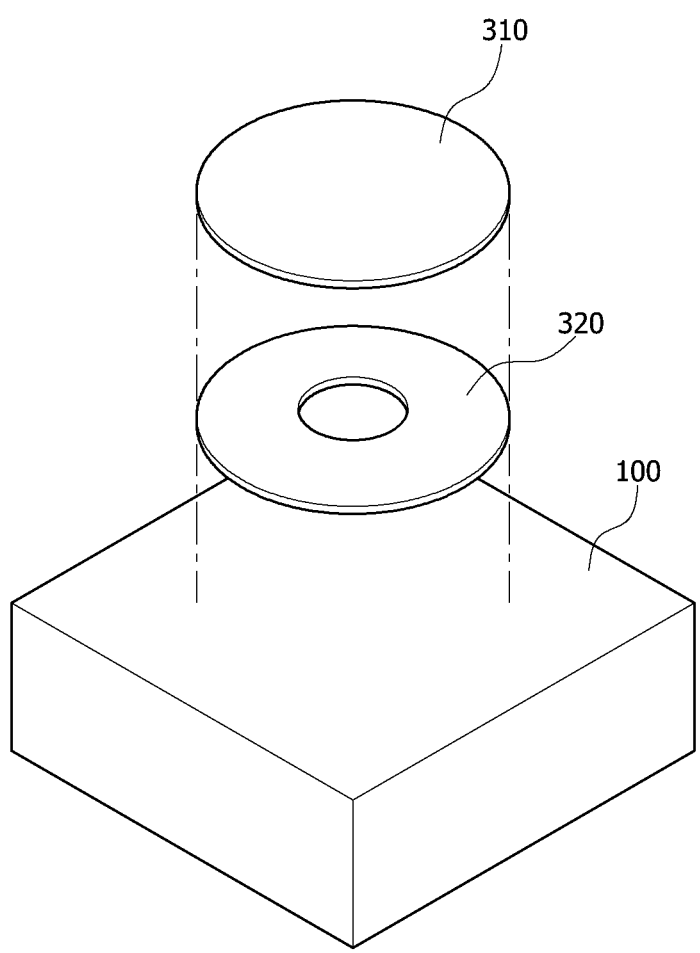
FIGS. 2 to 5 show an apparatus for driving an electronic device according to a second embodiment of the present invention.
Figure 3:
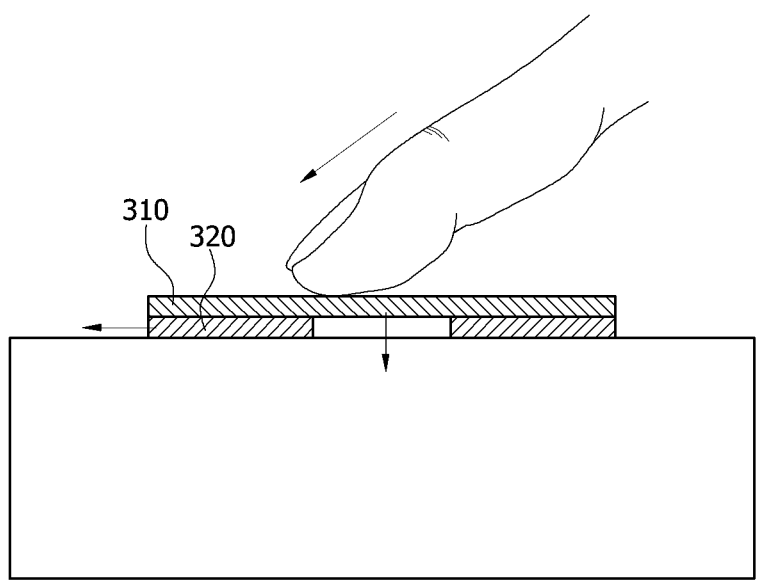
Figure 4:
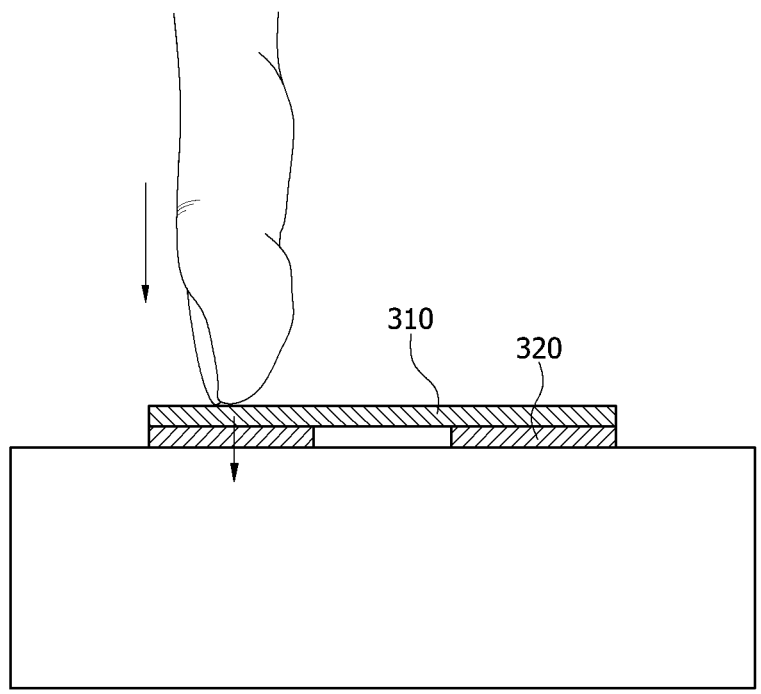

As shown in FIGS. 2 to 4, the apparatus for driving an electronic device according to the present embodiment includes a housing 100, the direction detecting means 310 that detects a direction of an external force applied in a lateral direction to generate a movement direction signal of a pointer, and the speed detecting means 320 that detects magnitude of an external force applied in a vertical direction to generate a speed change signal of the pointer. The direction detecting means 310 and the speed detecting means 320 are formed in a touchpad structure, and may be mounted on the top of the housing 100 in a stacked type, in an integrated type, or in a parallel type according to circumstances.

Figure 5:
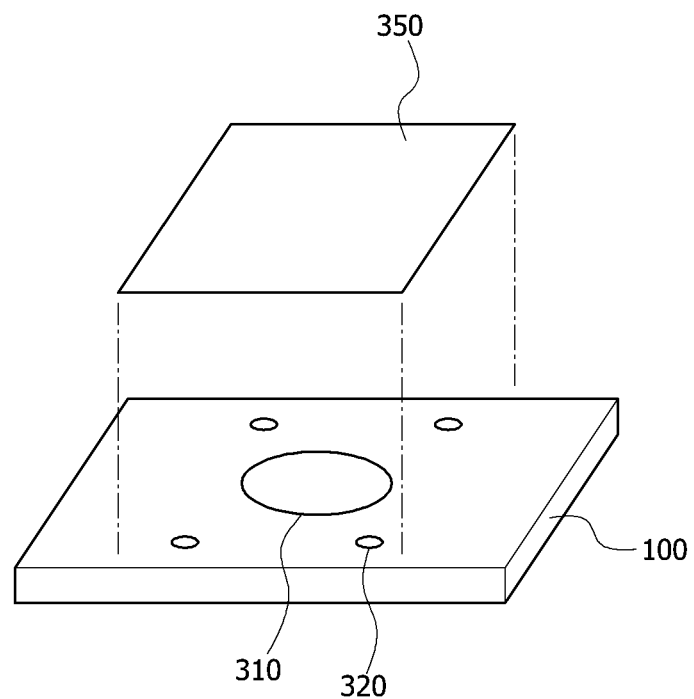

As shown in FIG. 5, the parallel type may be configured in such a manner that a region of the direction detecting means 310 such as a touchpad and a region of the speed detecting means 320 such as a pressure sensor or a switch are independently disposed on the housing or a printed circuit board (PCB), and a structure such as a glass 350 is mounted thereon. In this case, when the glass 350 disposed on the region of the direction detecting means 310 is dragged, this is detected by the direction detecting means 310 so that movement of the pointer occurs. When the glass is pressed, this is detected by the pressure sensor or the switch of the speed detecting means 320 so that a movement speed of the pointer varies.

Then, as shown in FIG. 3, when a user pushes the direction detecting means 310 and the speed detecting means 320 with his/her finger, a force applied to the direction detecting means 310 and the speed detecting means 320 can be divided into a horizontal force and a vertical force because a force pushed by the finger is typically applied in an inclined direction.

Here, the direction detecting means 310 detects the horizontal force to generate a movement direction signal of the pointer, and the speed detecting means 320 detects the vertical force to generate a speed change signal of the pointer. For example, when the user touches the top of the direction detecting means 310 with his/her finger, the direction detecting means 310 generates the movement direction signal of the pointer. When the user applies a vertical external force with his/her finger (i.e. pushes the speed detecting means 320), the speed detecting means 320 detects the pressure to generate the speed change signal of the pointer.

The touchpad configured to detect the direction and magnitude of the force applied in this way is widely applied to various mobile communication terminals or handheld electronic devices, and detailed description thereof will be omitted.

In the present embodiment, only the example in which the speed detecting means 320 is mounted under the direction detecting means 310 has been described. However, positions of the direction detecting means 310 and the speed detecting means 320 may be switched. In other words, the direction detecting means 310 may be mounted on the top of the housing 100 first, and the speed detecting means 320 may then be mounted thereon.

Further, the direction detecting means 310 and the speed detecting means 320 are formed in various shapes. For example, the direction detecting means 310 and the speed detecting means 320 may be formed in a square or circular shape so as to be able to uniformly receive a force even when the user applies the force in any direction according to circumstances. Here, to prevent the direction detecting means 310 from generating the movement direction signal of the pointer when the user touches the middle point of the speed detecting means 320 with his/her finger first, the direction detecting means 310 and the speed detecting means 320 may each be formed in a ring shape having a through-hole in the middle point thereof.

As shown in FIG. 4, when an external force is applied to a point of the direction detecting means 310 which is spaced apart from a reference position (e.g., the central point of the through-hole) in one direction, the direction detecting means 310 may be configured to generate the movement direction signal of the pointer in a direction extending from the reference position toward the point to which the external force is applied. Here, as in the embodiment shown in FIGS. 2 and 3, the speed detecting means 320 is configured to detect magnitude of the applied external force to generate the speed change signal of the pointer.

With this configuration, only a force pressing a specific position of the ring-shaped direction detecting means 310 in the vertical direction is detected using the through-hole as the reference position without detecting the horizontal external force. Thereby, movement direction and speed of the pointer can be set at one time. Thus, without separately applying the vertical and horizontal external forces to the point at which the direction detecting means 310 and the speed detecting means 320 are stacked, or without applying the inclined external force to the point at which the direction detecting means 310 and the speed detecting means 320 are stacked in one direction, the movement direction and speed of the pointer can be freely adjusted only by action of the user who applies the vertical external force to a point deviating from his/her desired direction.

As in the embodiment shown in FIGS. 2 to 4, when the direction detecting means 310 and the speed detecting means 320 are configured to directly receive the force, the mouse main body 200 can be removed, so that the apparatus for driving an electronic device can be simplified and miniaturized.

Further, the speed detecting means 320 may be configured to increase the movement speed of the pointer when the direction detecting means 310 detects a touch twice or more or application of touch pressure twice or more within a set time.

For example, when the user lightly hits the direction detecting means 310 twice or more within a short time in one direction, and the direction detecting means 310 detects the touch or the application of touch pressure twice or more, the speed detecting means 320 may be configured to be able to increase the movement speed of the pointer, aside from the configuration in which the movement speed of the pointer is increased by a downward pressurizing force. Thus, without applying a great downward pressurizing force, the movement speed of the pointer can be easily increased only by the action of the user who touches the top of the direction detecting means 310 or the speed detecting means 320 twice or more.

Figure 6:
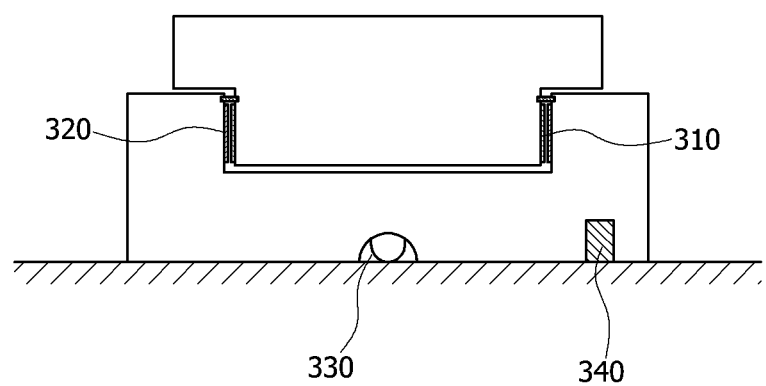
FIGS. 6 and 7 show an apparatus for driving an electronic device according to a third embodiment of the present invention.
Figure 7:
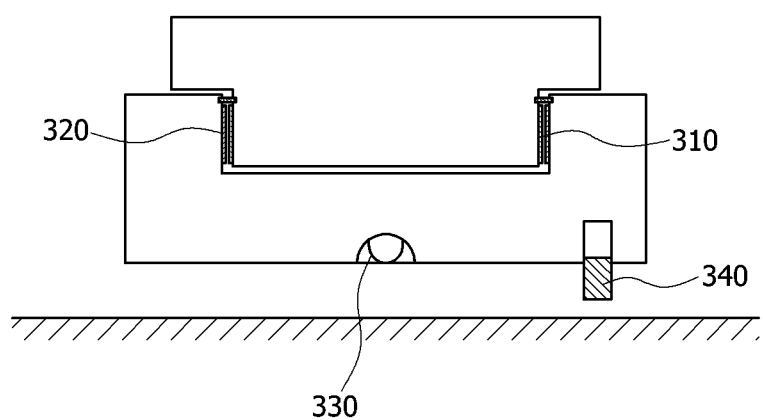

FIGS. 6 and 7 show an apparatus for driving an electronic device according to a third embodiment of the present invention.

Referring to FIGS. 6 and 7, the apparatus for driving an electronic device according to the present embodiment may further include a movement detecting means 330 at the bottom of the housing 100 so as to detect the movement of the housing 100 to generate a movement signal of the pointer. As long as the movement detecting means 330 can detect the movement of the housing 100, an optical sensor used for the typical optical mouse, or an assembly of a ball, rollers, and encoders used for the typical ball mouse may be applied as the movement detecting means 330. In other words, such a movement detecting means 330 is widely applied to the typical mousse in various types, and detailed description thereof will be omitted.

When the movement detecting means 330 is additionally provided in this way, the user moves the entire housing 100. Thereby, the apparatus for driving an electronic device according to the present embodiment can be used like the typical mouse.

Further, the bottom of the housing 100 is provided with a signal transfer switch 340 that detects whether or not the housing 100 is placed on the underlying surface. As shown in FIG. 6, in a state in which the housing 100 is placed on the underlying surface, the movement detecting means 330 may be configured to be operated. As shown in FIG. 7, in a state in which the housing 100 is spaced apart from the underlying surface, the movement detecting means 330 may be configured to be not operated.

As shown in the present embodiment, the signal transfer switch comes into or out of the housing 100. As such, the signal transfer switch can be replaced by switches of various structures such as a mechanical switch, an optical switch, and a magnetic switch that detects whether or not the housing 100 is placed on the underlying surface.

When the signal transfer switch 340 is additionally provided in this way, the user can easily select whether or not to operate the movement detecting means 330 by turning on/off the signal transfer switch.

Figure 8:
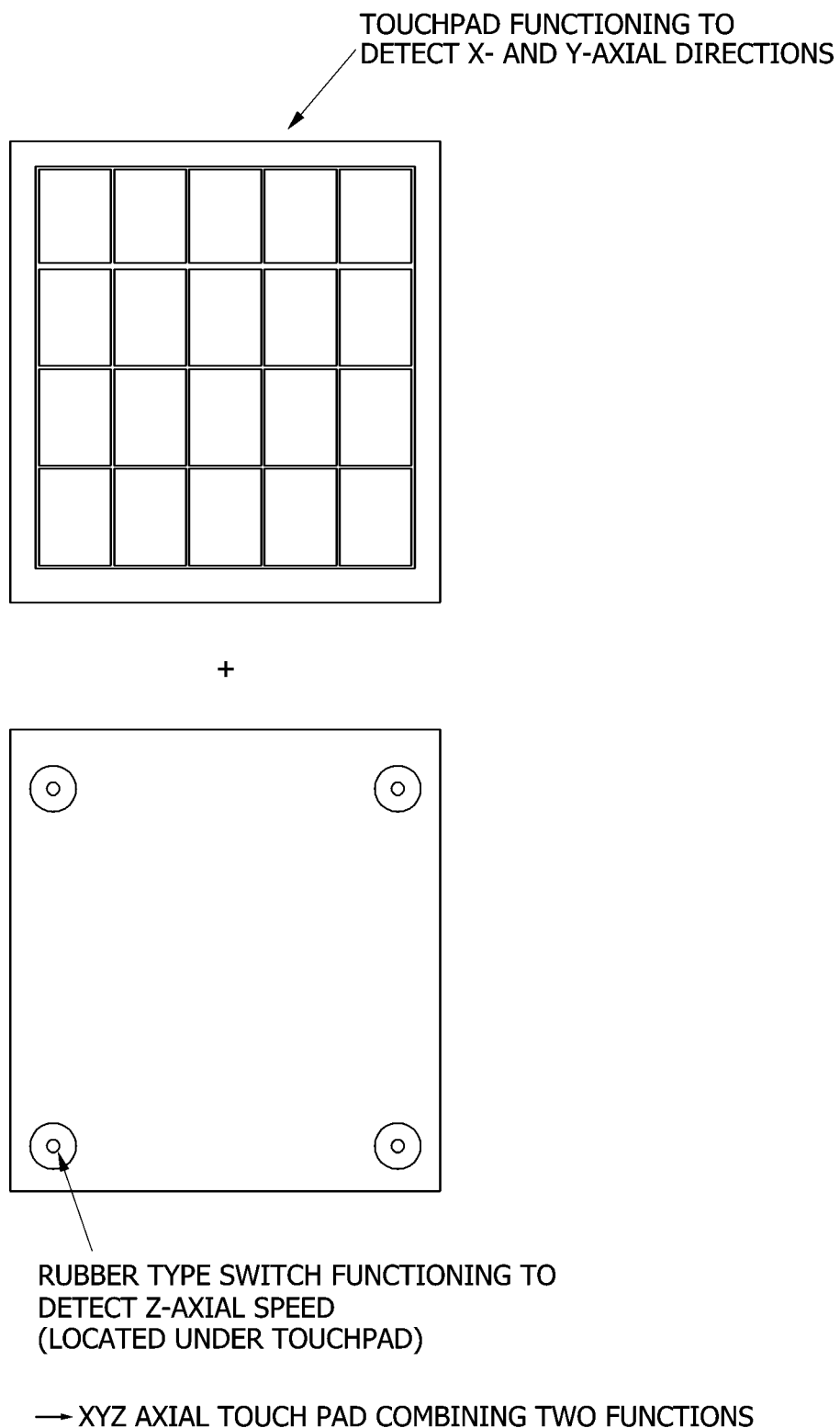
FIGS. 8 to 10 show an apparatus for driving an electronic device according to a fourth embodiment of the present invention.
Figure 9:
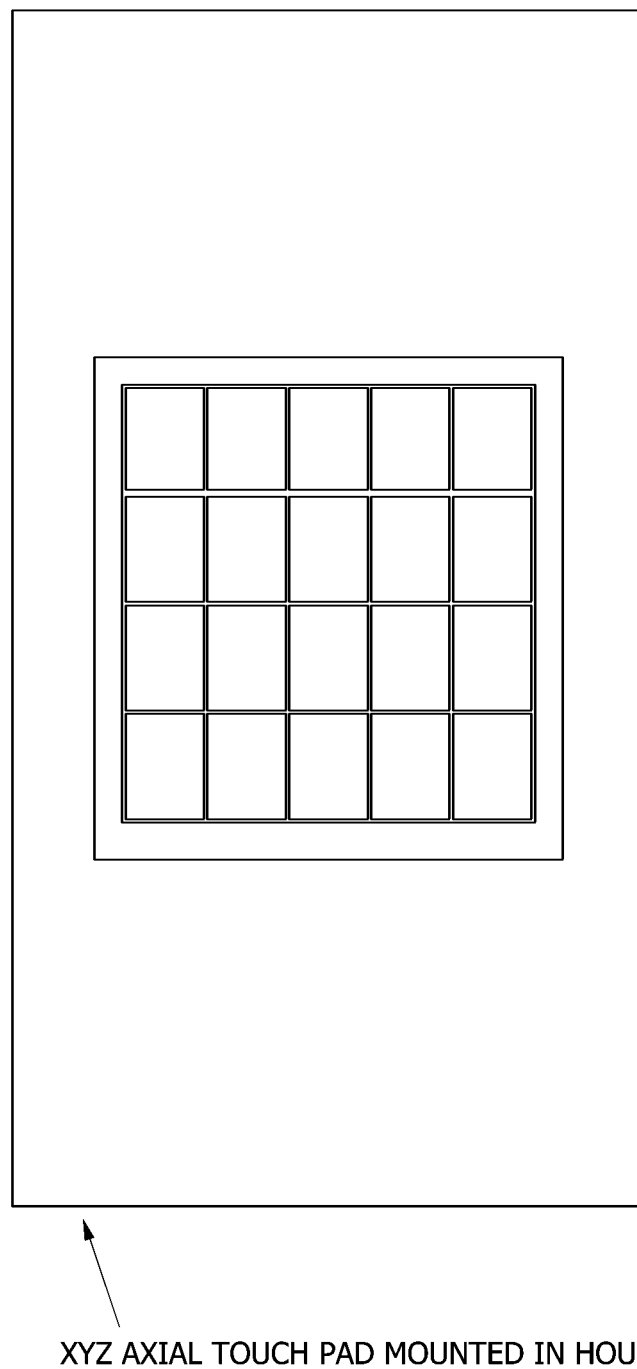
Figure 10:
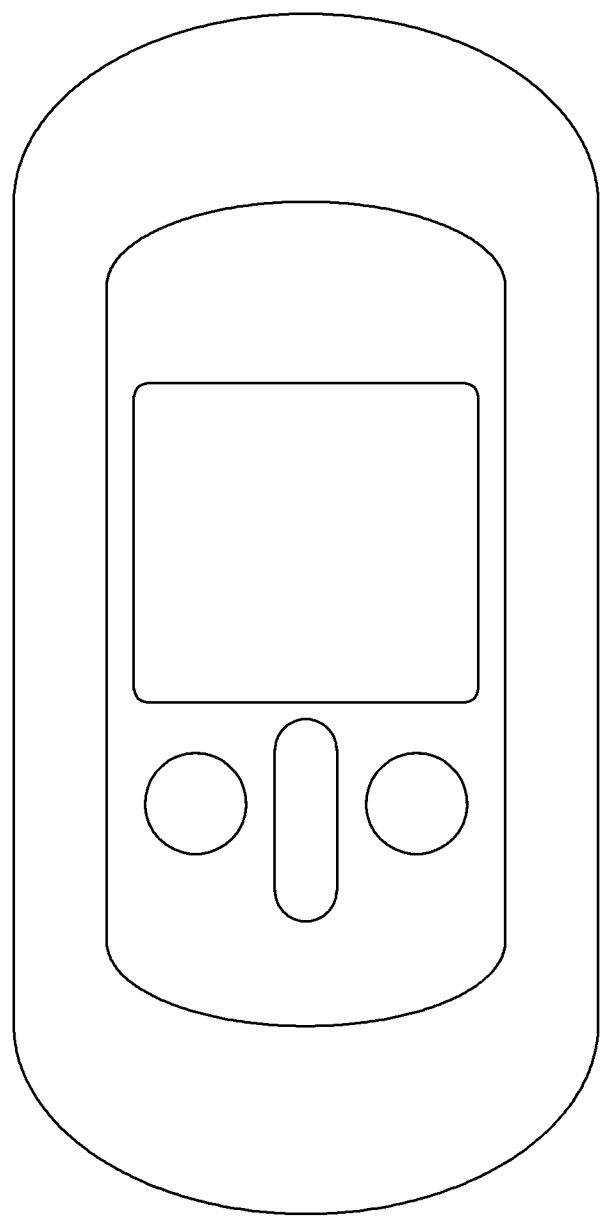

FIGS. 8 to 10 show an apparatus for driving an electronic device according to a fourth embodiment of the present invention. Particularly, FIGS. 8 to 10 are focused on the apparatus for driving an electronic device which has a touchpad.

Referring to FIG. 8, the apparatus for driving an electronic device according to the present embodiment includes a touchpad. The touchpad is characterized in that it can receive an input signal from X, Y, and Z axes. To this end, the touchpad includes a touchpad functioning to detect X- and Y-axial directions, and a unit functioning to detect a Z-axial speed.

The touchpad shown on the upper side of FIG. 8 is the touchpad functioning to detect the X- and Y-axial directions, and the touchpad shown on the lower side of FIG. 8 is a rubber type switch functioning to detect the Z-axial speed, and is disposed under the touchpad functioning to detect the X- and Y-axial directions. Thus, the two units are combined to be able to receive the input signal from the X, Y, and Z axes.

In this case, as described above, the direction detecting means 310 and the speed detecting means 320 may be formed in the touchpad structure so as to be mounted on the top of the housing 100 in the stacked type, or be formed in the integrated type, or in the parallel type according to circumstances as shown in FIG. 5. Especially, the touchpad functioning as the direction detecting means only needs to generate the movement signal of the pointer, and may be applied to an electrostatic type or a pressure sensitive type.

FIG. 9 shows a housing in which the touchpad shown in FIG. 8 is mounted on a PCB. FIG. 10 is a photograph showing a sample of the apparatus for driving an electric device in which the housing shown in FIG. 9 is case.

Referring to FIGS. 9 and 10, the apparatus for driving an electric device includes an input unit, i.e. a touchpad, into which information is input by a touch. A signal input by the apparatus for driving an electric device is displayed on a screen display unit by wire or radio. The apparatus for driving an electric device may have an input function which the mouse of the computer system performs, or be used as an input means of the digital television. Further, the screen display unit may include monitors for various electronic devices such as a television, a computer system, and so on. Moreover, the monitor may be one of various monitors such as a light-emitting diode (LED) display, a liquid crystal display (LCD), a plasma display panel, a cathode-ray tube (CRT) monitor, and so on.

The signal input by the apparatus for driving an electric device is displayed as the pointer on the screen display unit. A process of displaying and moving the pointer will be described in detail. First, when drag starts from a point, at which the input unit of the apparatus for driving an electric device is touched first, in an arbitrary direction, the pointer moves in the dragged direction. The input unit may include a touchscreen or a touchpad.

Next, when the drag is stopped, the movement of the pointer is stopped. Then, in the state in which the drag is stopped, the pointer further moves in response to pressing pressure in a direction from the point at which the touch occurs first to a point at which the pressing pressure is applied. Here, the pressing pressure may be generated by the rubber type switch having the Z-axial speed described in FIG. 8, or a pressure sensor or a tactile sensor.

Further, when the drag is additionally performed to another point on the basis of the point at which the pressing pressure is applied, the pointer moves in the dragged direction again. In this process, when the drag is stopped, the movement of the pointer is stopped. Then, the pointer further moves in the dragged direction at a point at which the drag is stopped in response to the pressing pressure.

Here, the movement speed of the pointer may be configured to be kept uniform or variable in response to magnitude of the pressing pressure. Further, when the pressure sensor or the tactile sensor is provided, the pointer can be realized to move at two or more different speeds according to the magnitude of the pressing pressure. Here, when the pressing pressure exceeds predetermined pressure, the movement speed of the pointer is changed.

Meanwhile, the pressing pressure may be realized by a simple switching operation. With use of a switch, the pointer can be realized to move in response to an on/off operation.

Further, when the pressing pressure replaced by the switching operation is applied to the same point twice or more, the movement speed of the pointer may be realized to be changed. In other words, when the switching operation is continuously given to the same point within a fixed time twice or trice, the movement speed of the pointer may be gradually increased.

Further, in the state in which the drag is stopped, the movement speed of the pointer that moves in response to the pressing pressure may be configured to cooperate with a drag speed. When the drag speed is set to a fast speed at the start, and the pressing pressure is applied to the stopped point, the pointer may be configured to move at a relatively fast speed. In contrast, when the drag speed is set to a slow speed at the start, and the pressing pressure is applied to the stopped point, the pointer may be configured to move at a relatively slow speed.

Meanwhile, the movement speed of the pointer may be controlled by adjusting the drag speed and the magnitude of the pressing pressure. The movement speed of the pointer may be differently set according to a condition that the drag speed is high, and the pressing pressure is high, a condition that the drag speed is high, and the pressing pressure is low, a condition that the drag speed is relatively low, and the pressing pressure is low, or a condition that the drag speed is relatively low, and the pressing pressure is high. The movement speed of the pointer can be set by properly combining the drag speed and the pressing pressure.

As described above, the example in which the information transmitted from the apparatus for driving an electric device according to each embodiment is used to move the point of the screen display unit has been described. However, such information may be used to control scroll of the screen. Further, the information may be used to control both of the scroll and the movement of the pointer.

While the embodiments of the present invention have been described in detail with reference to the drawings, it will be understood by those skilled in the art that the invention can be implemented in other specific forms without changing the technical spirit or essential features of the invention. Therefore, the scope of embodiments in accordance with the present invention is defined by the appended claims and their equivalents.

The invention claimed is:

1. A method of driving an electronic device including an input means into which information is input by a touch and a screen display means on which a pointer is displayed in response to the touch, the method comprising:
   a first step of moving the pointer from a point at which the touch is applied to the input means first in an arbitrary drag direction in which the pointer undergoes drag;
   a second step of stopping the movement of the pointer when the drag is stopped; and
   a third step of additionally moving the pointer in a direction, which is directed from the point at which the touch is applied first to a point to which pressing pressure is applied, in response to pressing pressure when the drag is stopped.

2. The method according to claim 1, further comprising:
   a fourth step of moving the pointer in the drag direction when the drag is additionally carried out to another point based on the point to which the pressing pressure is applied;
   a fifth step of stopping the movement of the pointer when the drag is stopped in the fourth step; and
   a sixth step of additionally moving the pointer in the drag direction in response to the pressing pressure at the point at which the drag is stopped.

3. The method according to claim 1, wherein, when the pressing pressure is applied to the same point twice or more, the pointer is subjected to a change in movement speed in correspondence with the applied pressing pressure.

4. The method according to claim 1, wherein the pointer is subjected to a change in movement speed in response to magnitude of the pressing pressure.

5. The method according to claim 4, wherein the pointer moves at two or more different speeds according to the magnitude of the pressing pressure.

6. The method according to claim 1, wherein the pressing pressure is implemented by a switching operation.

7. The method according to claim 1, wherein the pressing pressure is detected by a pressure sensor or a tactile sensor.

8. The method according to claim 1, wherein the pointer has a movement speed determined depending on the drag speed in response to the pressing pressure when the drag is stopped.

9. The method according to claim 1, wherein the input means includes a touchscreen or a touchpad.

10. An apparatus for driving an electronic device comprising:
    a housing having a seat recess;
    an input signal transfer main body that is fitted into the seat recess in whole or in part, and controls movement of a pointer displayed on a screen display unit;
    a direction detecting means that is located on the top of the input signal transfer main body, and generates a movement direction signal of the pointer; and
    a speed detecting means that is located at the bottom of the input signal transfer main body, and generates an additional movement signal or a movement speed change signal of the pointer in response to pressing pressure of the input signal transfer main body when the pressing pressure is applied, wherein the movement of the pointer displayed on the screen display unit is controlled using at least one of the movement direction signal of the pointer which is generated by the direction detecting means, the additional movement signal of the pointer which is generated by the speed detecting means, and the movement speed change signal of the pointer which is generated by the speed detecting means, wherein, when the pressing pressure of the input signal transfer main body is applied to the same point twice or more, the pointer is subjected to a change in movement speed in correspondence with the applied pressing pressure, and wherein the pressing pressure of the input signal transfer main body is implemented by a switching operation.

11. The apparatus according to claim 10, wherein the pointer is subjected to a change in movement speed in response to magnitude of the pressing pressure of the input signal transfer main body.

12. The apparatus according to claim 11, wherein the pressing pressure of the input signal transfer main body is detected by a pressure sensor or a tactile sensor.

13. The apparatus according to claim 10, wherein the direction detecting means includes a touchpad.

* * * * *